United States Patent

[11] 3,631,574

| [72] | Inventor | Vincent Frank Chapman<br>Reigate, England |
|---|---|---|
| [21] | Appl. No. | 790,590 |
| [22] | Filed | Jan. 13, 1969 |
| [45] | Patented | Jan. 4, 1972 |
| [73] | Assignee | Redland Tiles Limited<br>Reigate, England |
| [32] | Priority | Jan. 16, 1968 |
| [33] | | Great Britain |
| [31] | | 2,410/68 |

[54] CONVEYORS
6 Claims, 5 Drawing Figs.

[52] U.S. Cl. .................................................. 425/470,
198/189
[51] Int. Cl. ..................................................... B28b 3/20
[50] Field of Search .......................................... 25/11, 17
C, 18, 41.1, 41.3, 42, 43, DIG. 17, DIG. 18; 18/2, 4
C, 4 P, 9, 10; 198/189

[56] References Cited
UNITED STATES PATENTS

| 1,694,579 | 12/1928 | Brock | 25/42 |
| 3,193,903 | 7/1965 | White | 25/43 |
| 3,363,745 | 1/1968 | Thuerman | 198/189 |
| 2,715,958 | 8/1955 | Lindstrom et al. | 198/189 X |
| 2,180,284 | 11/1939 | Meyer | 198/189 X |

*Primary Examiner*—J. Spencer Overholser
*Assistant Examiner*—DeWalden W. Jones
*Attorney*—Young and Thompson ABSTRACT: A tile extrusion machine comprises an endless loop conveyor which carries the pallets through the extrusion apparatus at a constant speed. The conveyor comprises a succession of links forming a continuous surface to support the pallets across their widths and along their lengths, adjacent links being pivotally coupled together about axes perpendicular to the direction of movement of the conveyor, the axes being below the level of the pallet-supporting surfaces and directly below the ends of or outside the lengths of the pallet-supporting surfaces of the links, so that when a link pivots at either end of the conveyor no part of the link moves above the pallet-supporting surface of the links running over the bed.

PATENTED JAN 4 1972
3,631,574
SHEET 1 OF 3
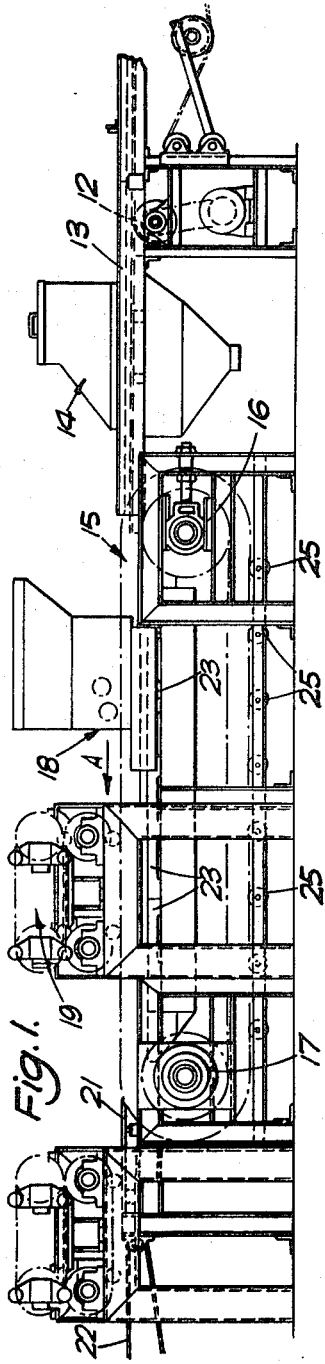
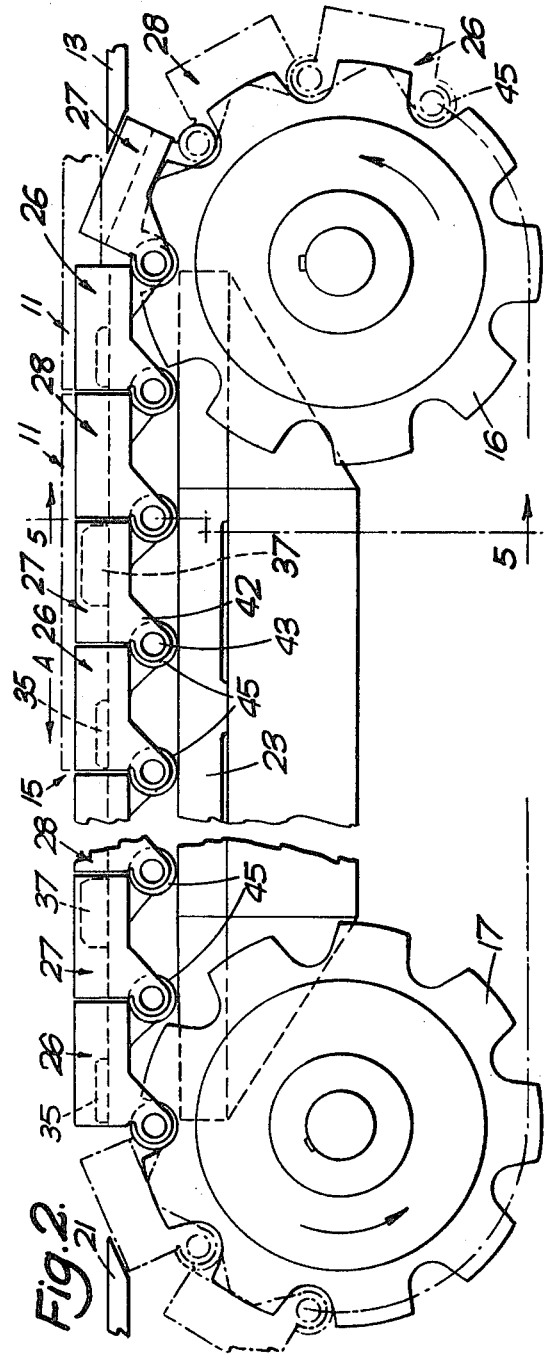
INVENTOR
VINCENT FRANK CHAPMAN
By Young & Thompson
ATTYS.

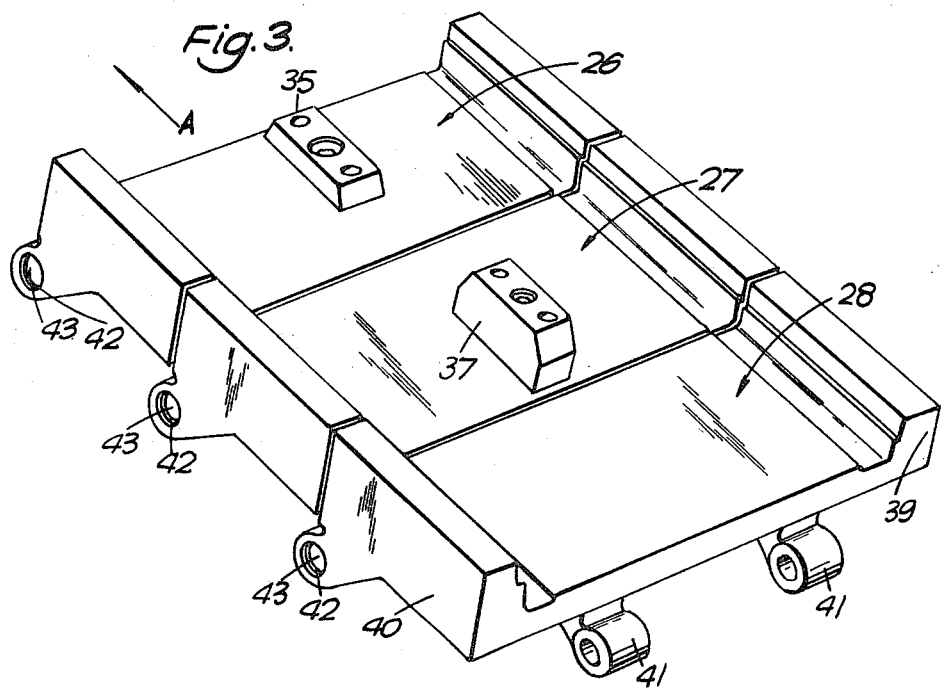
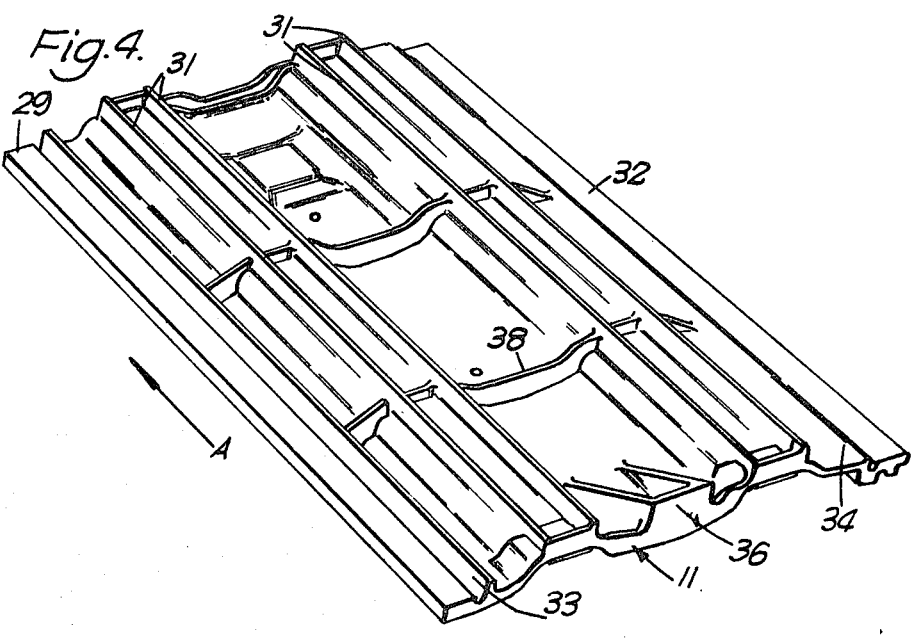

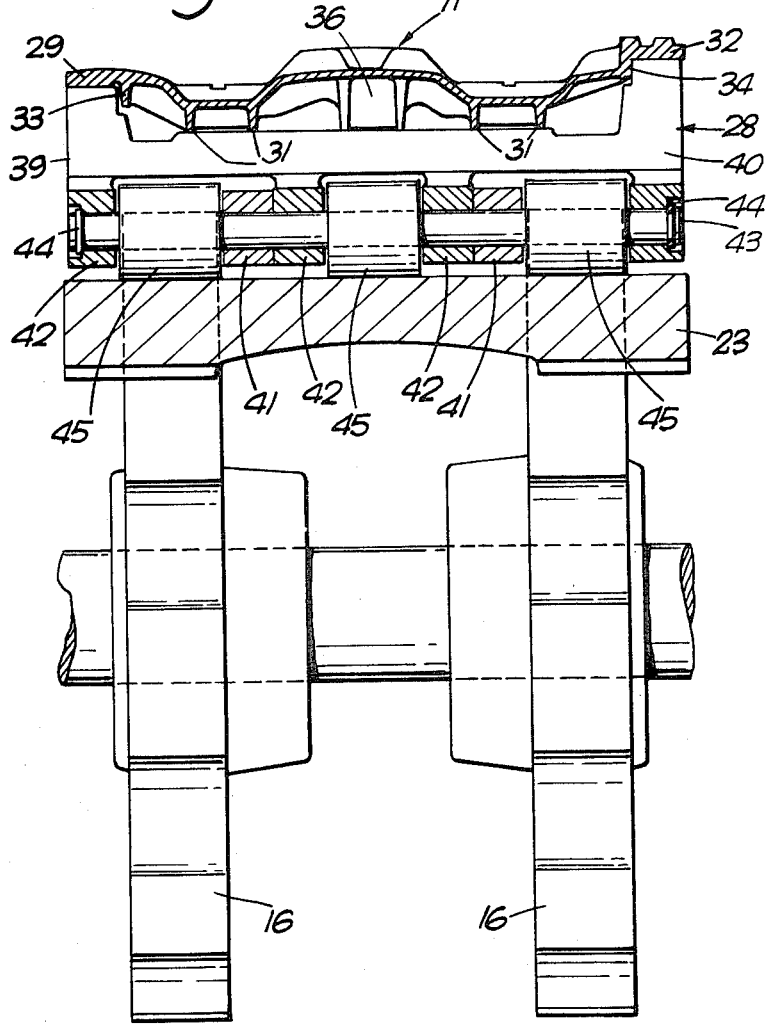

CONVEYORS

The invention relates to tile extrusion machines, and more particularly to conveyors for use in such machines.

The invention provides a tile extrusion machine of the kind having means to convey a succession of pallets through the machine, means to deposit tile-forming material on the pallets and means to shape the material on the pallets, in which there is a horizontal bed positioned below the conveying means which conveying means comprise an endless loop conveyor which is in contact with the bed as it passes the depositing and shaping means, the conveyor comprising a succession of links forming, as they move over the bed, a substantially continuous surface to support the pallets across their widths and along their lengths, and means to pivotally couple together adjacent links about axes perpendicular to the direction of movement of the conveyor, the axes being below the level of the pallet-supporting surfaces and directly below the ends of or outside the lengths of the pallet-supporting surfaces of the links, so that when a link pivots at either end of the conveyor no part of the link moves above the pallet-supporting surface of the links running over the bed, means being provided to drive the conveyor at a constant speed.

A tile-manufacturing machine incorporating an extrusion machine according to the invention will now be described with reference to the accompanying drawings, in which:

FIG. 1 is a schematic side view of a tile-manufacturing machine;

FIG. 2 is a partial side view of the conveyor used in the extrusion machine;

FIG. 3 is a perspective view of a section of the conveyor of FIG. 2;

FIG. 4 is a perspective view of the underside of a pallet; and

FIG. 5 is a view on the line 5–5 in FIG. 2.

Referring to FIG. 1, pallets 11 pass from a "crowding" conveyor 12 on to a slideway 13, and travel on the slideway through an oiler 14, which coats their upper surfaces with oil so that tile material will not adhere to the pallets. The pallets 11 then pass on to an endless loop conveyor 15 which runs at a constant speed between two pairs of sprockets 16, 17. The conveyor 15, which will be described in greater detail hereafter, carries the pallets through an extrusion apparatus 18 which deposits uncured concrete on the pallet and shapes it by means of a pressure roller, whose axis is perpendicular to the line of the conveyor 15. The pallets 11 with the uncured tiles are then carried past an apparatus 19, which embodies knives which move at the same speed as the conveyor and are operable to cut the continuous concrete extrusion between adjacent pallets to form separate tiles. The pallets are then discharged on to a slideway 21 and thence on to a conveyor 22. The tiles on the pallets are cured in the usual way and then the pallets are separated from the tiles for reuse.

The conveyor 15 comprises a series of sets of three cast iron links 26, 27, 28 (FIG. 3) the lengths of which are such that each set of three links have the same total length as one pallet 11. The links and pallets travel in the direction of the arrows A in the Figures. The upper surfaces of each link engage longitudinal surfaces 29, 31, 32, 33, 34 on the underside of the pallet, whereby the pallet is effectively supported across its width for its full length. The leading link 26 of each set of three links is provided with a pawl 35 which engages behind the projection 36 at the rear of the pallet on the preceding set of links, to locate the pallet and prevent its rearward movement. The center link 27 is provided with a stop 37 which locates in front of the transverse rib 38 of the pallet, to prevent forward displacement of the pallet. Lateral location is provided by engagement between the ribs 33, 34 and steps cut in the sidewalls 39, 40 of the links.

Extending downwardly and rearwardly from the back of each link member are two brackets 41, and from the front four brackets 42 protrude downwardly and forwardly. As may be seen from FIG. 5, the brackets 41 and 42 of adjacent links are aligned and are pivotally coupled together by a pin 43 passing through the brackets and held in place by circlips 44. Each pin 43 also carries three rollers 45 in spaces between the brackets, which rollers run on bed units 23 which support the links on the upper flight of the conveyor. The sprocket wheels 16 and 17 engage the outer rollers 45 to drive the conveyor. The sprocket wheels each have nine teeth, so that three pallets pass for each revolution. This makes it easy to synchronize the cutting apparatus 19 with the rest of the machine.

The axes of the pins 43 lie between the ends of adjacent links, and below their pallet contacting surfaces. As a result of this, it is possible to provide a virtually unbroken support surface, and also at no time does a link protrude upwardly above the level of the support surface as it passes around a sprocket, so that the pallets are not displaced vertically at the ends of the conveyor. The pawl 35 and the stop 37 have chamfered end faces, so that they do not accelerate or decelerate the pallets at the ends of the conveyor; if desired, these end faces may have gear-tooth profiles to ensure absolute uniformity of speed.

The return flight of the conveyor is supported by rollers 25, as shown in FIG. 1.

It will be clear that if pallets are to be automatically fed on to and removed from the conveyor in a continuous stream, without being jolted, the conveyor must adequately support each pallet during the transition period when one link of the set 26, 27, 28 is not in contact with it but it is also unsupported by a slideway. If each pallet is supported by only two links this is very difficult, as the pallet would be unbalanced at one end of the conveyor. If there is only one link for each pallet it is very hard to arrange the transfer of the pallets at all and it usually has to be done by hand. Thus, it will be clear that at least three links are needed to support each pallet if an endless loop conveyor is to be used in modern tile extrusion machinery, so that at least two thirds of the length of the pallet are supported at any moment. More than three links may, of course, be used.

In operation of the machine, pallets 11 are fed on to the slideway 13 by the conveyor 12, which is driven at a higher speed than the conveyor 15, so that the pallets travel in a continuous end-to-end stream along the slideway 13. Each pallet 11 is removed in turn from the slideway by a set of three links 26, 27, 28 of the conveyor 15, and the pallets are conveyed through the extrusion machine 18 and the cutting machine 19 in a continuous end-to-end stream. Means may be provided at the slideway 13 to detect a break in the supply of pallets and stop the conveyor 15, because it is extremely undesirable for the conveyor to pass through the extrusion apparatus when not carrying a pallet, as concrete would then get deposited directly onto the conveyor links.

The invention has a number of advantages over known arrangements in which a continuous stream of pallets is pushed along a slideway by a moving arm, the slideway extending through the extrusion apparatus (e.g., 18) and the cutting apparatus (e.g. 19). Because of the high pressures in the extrusion apparatus such a machine has a high rate of wear of the pallets and slideway and uses a lot of power. Further, the presence of concrete on the ends of the pallets will adversely affect the synchronization of the cutting apparatus 19, and the speed of such a system can not be truly constant, so that the freshly made tiles are continually jolted, which can ruin them. None of these disadvantages exist in the machine of the invention, which is cheap to run and operates very smoothly.

It will be appreciated that the invention is not restricted to the details of this example.

I claim:

1. Tile extrusion apparatus comprising:
   a. a horizontal bed,
   b. a plurality of pallets,
   c. an endless loop conveyor to convey said pallets in a continuous stream over said bed, the conveyor consisting of a plurality of pallet-supporting links pivotally coupled together end to end by horizontal axles, the axes of said axles being below the level of and not within the length of the pallet-supporting surface of any one link, and at least one roller mounted on each of said axles and capable of making contact with the bed, the cooperating portions of the pallets and links being dimensional and shaped so that the portion of the conveyor above the bed forms a substantially continuous surface which supports and locates each pallet over the length and width of the pallet and so that each pallet is supported on portions of at least three links, d. means above the portion of the stream passing over the bed to deposit tile-forming material on the pallets, and e. a pressure roller above the portion of the stream passing over the bed to shape the material on the pallets.

2. Apparatus as claimed in claim 1 wherein a whole number, which is at least three, of links are arranged to have the same length as a pallet.

3. Apparatus as claimed in claim 1 wherein a set of at least three links are arranged to have the same length as, and to positively locate, a pallet.

4. Apparatus as claimed in claim 1 wherein the machine is provided with roller means to support the return flight of the endless loop conveyor.

5. Tile extrusion apparatus as claimed in claim 1 in which the endless loop conveyor passes around wheels at the ends of the conveyor and having axes below the horizontal bed, and in which other conveying means are arranged at the ends of the said conveyor to support pallets at the level of the said conveyor before and after the conveyor engages with or disengages from the pallets, so that the conveyor and the conveying means are arranged to support the pallets at the same level throughout the machine.

6. Apparatus as claimed in claim 5 wherein the means for locating each pallet are shaped so as to both positively drive said pallet and also to disengage therefrom at the end of the first conveyor without jolting the pallet.

* * * * *